US009121768B2

(12) United States Patent
Raychowdhury et al.

(10) Patent No.: US 9,121,768 B2
(45) Date of Patent: *Sep. 1, 2015

(54) THERMAL SENSOR DEVICE

(75) Inventors: Arijit Raychowdhury, Hillsboro, OR (US); Hasnain Lakdawala, Beaverton, OR (US); Yee (William) Li, Beaverton, OR (US); Greg Taylor, Portland, OR (US); Soumyanath Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 13/328,546

(22) Filed: Dec. 16, 2011

(65) Prior Publication Data

US 2012/0087390 A1 Apr. 12, 2012

Related U.S. Application Data

(63) Continuation of application No. 12/164,937, filed on Jun. 30, 2008, now Pat. No. 8,096,707.

(51) Int. Cl.
*G01K 7/00* (2006.01)
*G01K 7/01* (2006.01)

(52) U.S. Cl.
CPC ............ *G01K 7/015* (2013.01); *G01K 2219/00* (2013.01)

(58) Field of Classification Search
USPC .................................................. 374/178, 170
See application file for complete search history.

(56) References Cited

U.S. PATENT DOCUMENTS

| 5,982,221 | A | * | 11/1999 | Tuthill | 327/512 |
|---|---|---|---|---|---|
| 6,008,685 | A | * | 12/1999 | Kunst | 327/512 |
| 6,462,612 | B1 | * | 10/2002 | Roh et al. | 327/539 |
| 6,554,469 | B1 | * | 4/2003 | Thomson et al. | 374/178 |
| 6,808,307 | B1 | * | 10/2004 | Aslan et al. | 374/178 |
| 6,869,216 | B1 | | 3/2005 | Holloway et al. | |
| 7,082,377 | B1 | * | 7/2006 | Aslan et al. | 702/130 |
| 7,118,273 | B1 | * | 10/2006 | Schnaitter | 374/168 |
| 7,252,432 | B1 | * | 8/2007 | Henderson et al. | 374/183 |
| 7,253,598 | B1 | * | 8/2007 | Doyle et al. | 323/316 |
| 7,429,129 | B2 | * | 9/2008 | St. Pierre et al. | 374/178 |
| 7,766,546 | B1 | * | 8/2010 | Aslan et al. | 374/178 |

(Continued)

FOREIGN PATENT DOCUMENTS

WO WO 2007036293 A1 * 4/2007

OTHER PUBLICATIONS

Translation of WO 2007/036293 Niederberger (Apr. 5, 2007).*

(Continued)

*Primary Examiner* — Mirellys Jagan
(74) *Attorney, Agent, or Firm* — Green, Howard, & Mughal, LLP

(57) ABSTRACT

A thermal sensor is provided that includes a front-end component, an analog-to-digital converter and a digital backend. The front-end component including an array of current sources, a dynamic element matching (DEM) device, an analog chopper and two diodes to sense temperatures on the die. The front-end component to provide analog signals at two output nodes based on currents through the two diodes. The analog-to-digital converter to receive the analog signals from the front-end component and to provide an output signal. The digital backend to receive the output signal from the analog-to-digital converter and to provide a calculated temperature.

22 Claims, 4 Drawing Sheets

(56) References Cited

U.S. PATENT DOCUMENTS

| | | | |
|---|---|---|---|
| 7,841,770 B2* | 11/2010 | Lee et al. | 374/178 |
| 8,092,083 B2* | 1/2012 | Venkataraman et al. | 374/178 |
| 8,130,025 B2* | 3/2012 | Kutz | 327/513 |
| 2004/0004994 A1 | 1/2004 | Wu et al. | |
| 2004/0146086 A1 | 7/2004 | Gauthier et al. | |
| 2005/0220171 A1* | 10/2005 | Faour et al. | 374/178 |
| 2006/0093016 A1* | 5/2006 | McLeod et al. | 374/178 |
| 2006/0193370 A1* | 8/2006 | St. Pierre et al. | 374/178 |
| 2006/0203883 A1* | 9/2006 | Griffin | 374/178 |
| 2006/0267668 A1* | 11/2006 | Porter | 327/512 |
| 2008/0001615 A1* | 1/2008 | Lim et al. | 324/760 |
| 2008/0095213 A1 | 4/2008 | Lin et al. | |
| 2008/0259998 A1* | 10/2008 | Venkataraman et al. | 374/170 |
| 2008/0278142 A1* | 11/2008 | Takada | 324/76.12 |
| 2009/0009234 A1* | 1/2009 | St. Pierre et al. | 327/512 |
| 2009/0196322 A1 | 8/2009 | McCarthy et al. | |
| 2010/0002748 A1* | 1/2010 | Lin et al. | 374/170 |
| 2010/0013544 A1* | 1/2010 | Niederberger | 327/513 |
| 2010/0040111 A1* | 2/2010 | Cheng et al. | 374/170 |
| 2013/0120930 A1* | 5/2013 | Temkine et al. | 361/679.47 |

OTHER PUBLICATIONS

Analog Devices, ± 1° Temperature Monitor with Series Resistance Cancellation, ADT7461, 2004 Analog Devices, Inc. pp. 1-24.

Non-Final Office Action mailed Jun. 22, 2011 for U.S. Appl. No. 12/164,937, 12 pages.

Notice of Allowance mailed Oct. 3, 2011 for U.S. Appl. No. 12/164,937, 7 pages.

* cited by examiner

THERMAL SENSOR DEVICE

The present patent application is a Continuation of, and claims priority to and incorporates by reference in its entirety, the corresponding U.S. patent application Ser. No. 12/164,937, entitled "THERMAL SENSOR DEVICE" filed on Jun. 30, 2008, and issued as U.S. Pat. No. 8,096,707 on Jan. 17, 2012.

BACKGROUND

1. Field

Embodiments of the present invention may relate to a thermal sensor to sense a temperature of a die.

2. Background

Integrated circuits (ICs) may generate heat when powered by an electric source such as a power supply. ICs are generally susceptible to overheating which may cause the IC or a device, such as a microprocessor, in which the IC is employed to fail, to malfunction, to be uncomfortable for a user to handle, or to otherwise diminish the utility of the IC or the device. Controlling excess heating in ICs may become more of a problem as more powerful and more complex ICs are packaged in smaller and lighter IC packages. For example, computers are steadily increasing an amount and density of memory. Increases in clock speeds and device activity combined with increases in number and density of devices in one chip or die may further increase the heating of the devices.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
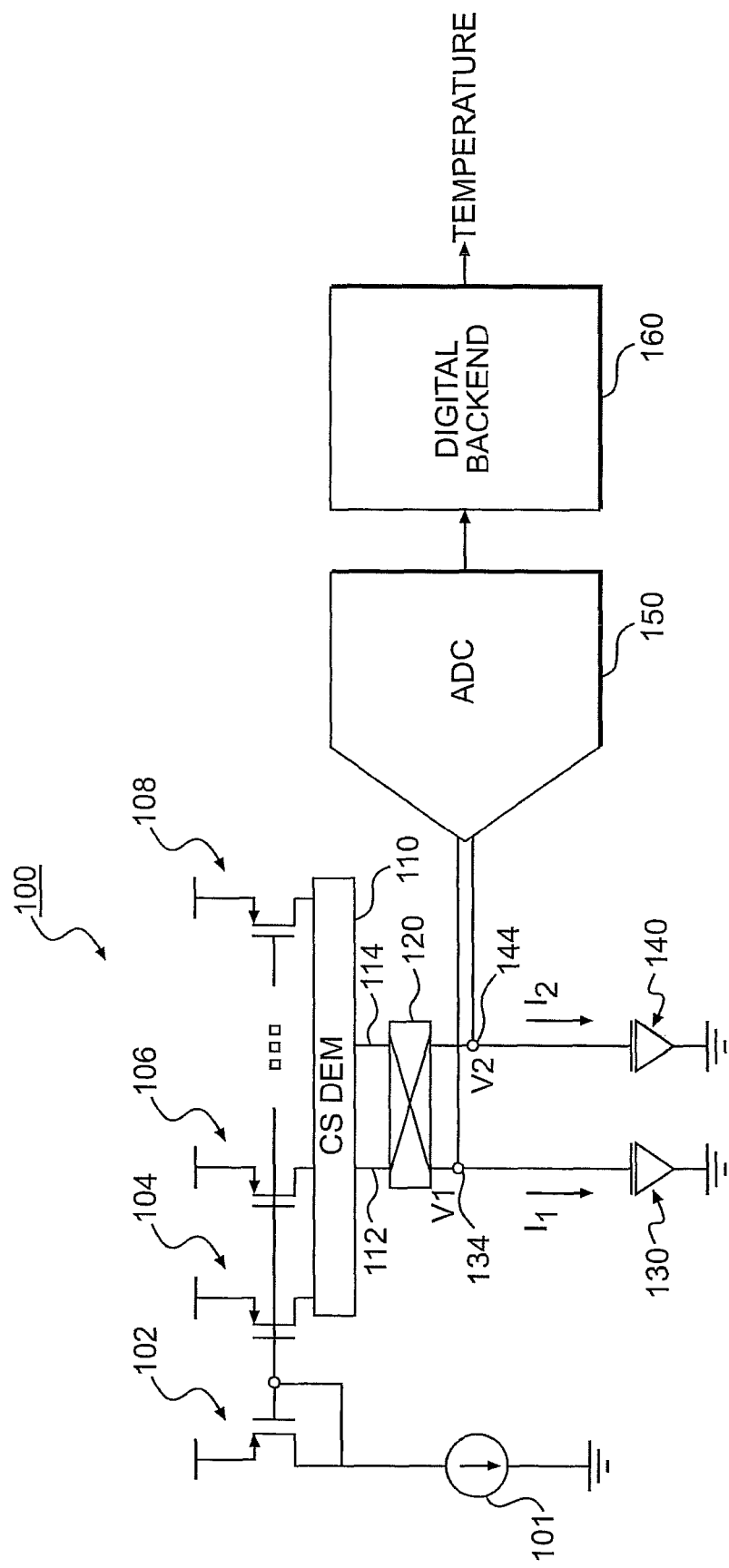
FIG. 1 is a diagram of a thermal sensor device according to an example embodiment of the present invention.

Thermal management may be used to prevent an IC and a device in which the IC is employed (such as a microprocessor) from overheating and/or from allowing excess leakage. A variety of thermal management devices and techniques may prevent ICs from overheating. These devices may include fans, fins, and liquid cooling pipes that draw heat away from the IC. Some thermal management devices may adjust a duty cycle by, for example, reducing clock speeds or input and output rates or voltages to reduce the temperature.

When the temperature on a die is sensed directly, then fans or duty cycle adjustments may be applied in response to the sensed temperature. If the IC is running cool, then fans, coolers or duty cycle adjustments can be turned off, saving power and increasing performance. The more accurate the temperature measurement, then the more accurate the use of the thermal management devices. This may allow, for example, the fan to be turned on only when absolutely necessary, reducing noise and power consumption. The more accurate the thermal sensor, the more accurate the control.

A thermal sensor may track a temperature of a die or a microprocessor on a die. For example, a sensing diode and analog circuitry (external to the die) may be used to sense and detect a temperature of the die or the microprocessor on the die. Voltage/current characteristics of the diode may change depending upon temperature of the IC. The external analog circuitry may measure the voltage or current characteristics of the diode.

Thermal sensors may not generate an accurate temperature of the die or the microprocessor on the die. Various factors may affect the accuracy of the thermal sensor such as reduced supply voltages, process variations in lithography, flicker noise, etc. In addition, parasitic resistance of electronic components such as diodes, present in the microprocessor, may lead to erroneous measurements of temperature.

Additionally, local heating of circuit blocks on the microprocessor may be concern for reliability and power consumption. The area circuit may be provided in a different area than the sensing diode. Of concern for the remote location of the diode may be a series resistance of connections. Interconnect resistance may be a source of error in measurement. Further, variation of doping and wire resistance of the diode may produce a parasitic series resistance.

Embodiments of the present invention may provide a thermal sensor circuit that includes two sensing diodes that are driven by current sources. An output of the thermal sensor circuit may be provided to an analog-to-digital converter (ADC). The analog-to-digital converter (ADC) may convert analog temperature-dependent voltages into digital readings. Embodiments of the present invention may provide analog chopping between the sensing diodes and the current sources. Therefore, a temperature-dependent signal may be modulated and processed away from a GROUND voltage and a supply voltage can be kept relatively small. Additionally, a flicker noise spectrum may decrease with an increase in frequency. Embodiments of the present invention may further provide a dynamic element matching (DEM) device at a front-end such that process variations may be reduced and/or minimized.

Embodiments of the present invention may use diode voltages to sense temperatures of the die. More specifically, an array of current sources and at least two diodes may be used to sense temperatures based on currents from the current sources flowing through the diodes. The use of two diodes allows a measurement of the voltage based on a ratio of the currents from the current sources.

Analog chopping may be performed between the current sources and the diodes. The chopped signals may be converted in a digital domain using an analog-to-digital converter (ADC). The chopped signal may be demodulated in the digital domain and therefore DC noise may be reduced and/or eliminated.

FIG. 1 is a diagram of a thermal sensor device according to an example embodiment of the present invention. Other embodiments and configurations are also within the scope of the present invention. More specifically, FIG. 1 shows a thermal sensor that includes a front-end component 100, an analog-to-digital converter (ADC) 150 (or ratiometric ADC) and a digital backend 160 that includes a digital mixer and/or a demodulator.

The front-end component 100 may include a reference current source 101 and an array of current sources 102, 104, 106 and 108. For ease of illustration, only the current sources 102, 104, 106 and 108 are shown in the array. However, other numbers of current sources may also be provided.

The front-end component 100 may further include a current source (CS) dynamic element matching (DEM) device 110 and a chopper 120. The DEM device 110 may be coupled to each of the current sources 104, 106 and 108 to provide current from the current sources to the chopper 120. The chopper 120 receives outputs of the DEM device 110 on signal lines 112 and 114. The outputs on the signal lines 112 and 114 represent currents (and ratios of currents) selected by the DEM device 110. The chopper 120 provides outputs at nodes 134 and 144. The outputs of the chopper 120 are shown as currents $I_1$ and $I_2$. The chopper 120 may be referred to as an analog current chopper.

The node 134 may be coupled to a sensing diode 130 to sense a temperature of a die. The node 144 may be coupled to a sensing diode 140 to sense a temperature of a die. The nodes 134 and 144 may be referred to or considered as output nodes.

The diode 130 shown in FIG. 1 may be a component of a bipolar junction transistor in which an emitter of the transistor is coupled to the node 134 and a collector and base of the transistor is coupled to GROUND. The diode 140 shown in FIG. 1 may also be a component of a bipolar junction transistor in which an emitter of the transistor is coupled to the node 144 and a collector and base of the transistor is coupled to GROUND. Alternatively, each of the diodes 130 and 140 may be a component of a metal oxide semiconductor (MOS) transistor or other types of transistors. For ease of description and illustration, FIG. 1 shows the diodes 130 and 140 rather than showing transistors.

The current sources 104, 106 and 108 are arranged in an array to inject current $I_1$ and $I_2$ into the diodes 130 and 140, respectively, via the DEM device 110. As a result of the current $I_1$ flowing through the diode 130, a voltage V1 is provided at the node 134. Additionally, as a result of the current $I_2$ flowing through the diode 140, a voltage V2 is provided at the node 144.

The DEM device 110 may include a plurality of switches that operate to provide different amounts or different ratios of currents to the signal lines 112 and 114 by controlling the currents that enters and/or exits the DEM device 110. The switches of the DEM device 110 may be controlled by a controller or processor (not shown in FIG. 1). The DEM device 110 may provide different ratios of currents to the diodes 130 and 140 by controlling outputs of the current sources (and thus inputs to the DEM device 110). This may therefore provide different voltages V1 and V2 at the nodes 134 and 144 based on the current $I_1$ and $I_2$ flowing through the diodes 130 and 140. The voltages V1 and V2 may represent a ratio of voltages based on the currents selected to flow through the diodes 130 and 140.

The DEM device 110 may provide the current $I_1$ at a first level (such as a 1× current) along the signal line 112 (and to the diode 130), and provide the current $I_2$ at a second level (such as a 5× current) along the signal line 114 (and to the diode 140). The 1× current may be provided by having current flow through only one of the current sources 104, 106, 108 of the current array. The 5× current may be provided by having current flow through five current sources of the current array, for example. The voltages V1 and V2 at the nodes 134 and 144 are analog voltages to be provided to the ADC 150. In the above example, the DEM device 110 provides two different voltages when the currents have a 1:5 ratio.

The DEM device 110 may provide other ratios of currents to the signal lines 112 and 114 and ultimately to the diodes 130 and 140, respectively. For example, the DEM device 110 may provide a 1× current on the signal line 112 and a 3× current on the signal line 114. The DEM device 110 may provide two different voltages when the currents are in a 1:3 ratio. Other ratios of the currents $I_1$ and $I_2$ may also be provided. The different ratios of the currents on the signal lines 112 and 114 may be used to provide further data and thus a more accurate indication of the temperature of the die.

Embodiments of the present invention may provide different ratios of currents $I_1$ and $I_2$ along the signal lines 112 and 114 and thereby provide different values for the voltages V1 and V2. The DEM device 110 may change the ratios of the currents $I_1$ and $I_2$ on the signal lines 112 and 114 to provide different amounts of currents for the diodes 130 and 140 to sense temperature of the die. This may provide a more accurate measurement and reduce and/or eliminate irregularities. Measurements of temperature at different ratios may mathematically remove non-idealities (such as series diode resistances) in the sensing diodes. The non-ideality of the sensing diodes may also be removed and/or reduced by using a look up table (or similar type of mechanism) that relates multiple measurements to a single temperature. The look up table may be programmed during testing of the die or may be computed mathematically. Due to a plurality of different ratios, a more accurate determination of the die temperature may be made by the diodes 130 and 140.

The DEM device 110 may provide two output currents to the chopper 120. The chopper 120 may provide the currents received along the signal lines 112 and 114 to the nodes 134 and 144. In one example, the chopper 120 may direct the current on the signal line 112 to the node 134 and direct the current on the signal line 114 to the node 144. In another example, the chopper 120 may direct the current on the signal line 112 to the node 144 and direct the current on the signal line 114 to the node 134. Stated differently, the chopper 120 may direct the two output currents of the DEM device 110 to different ones of the two nodes 134, 144. The chopper 120 is a current chopper since the chopper 120 directs the input currents to respective outputs, namely the nodes 134 and 144. The chopper 120 also is an analog chopper since the chopper 120 is provided in an analog domain.

The chopper 120 may provide a result of the analog chopping to the nodes 134 and 144. That is, the chopper 120 may reverse the signals applied to the nodes 134 and 144. The different current ratios in the diodes 130 and 140 due to the chopping may move the diode signal (V1-V2) to higher frequency so that DC errors may be filtered out.

The DEM 110 device and the chopper 120 may provide different ratios of currents to the nodes 134 and 144 and to the diodes 130 and 140. The DEM device 110 and the chopper 120 control a ratio of currents to flow through the diodes 130 and 140. This allows the front-end component 100 of the thermal sensor device to provide more relevant data for determining a temperature of the die.

The DEM device 110 and the chopper 120 may average out any mismatch and/or variation between the current sources 104, 106 and 108. For example, the DEM device 110 may provide different currents (or different ratios of currents) to the signal lines 112 and 114 rather than using area scaling.

The analog-to-digital converter (ADC) 150 may be coupled to the nodes 134 and 144 to receive the voltages V1 and V2. The voltages V1 and V2 represent the voltages across the diodes 132 and 142 when the diodes 130 and 140 are sensing the temperature of the die (by the currents $I_1$ and $I_2$ flowing). The ADC 150 may perform an analog to digital conversion of the voltages V1 and V2 on the nodes 134 and 144. That is, the ADC 150 may receive analog voltage signals from the nodes 134 and 144 and convert the analog voltage signals to corresponding digital signals. The ADC 150 may operate without receiving an outside reference signal or bandgap signal. That is, the ADC 150 may determine a digital bandgap in the digital domain based on the voltages V1 and V2 (across the diodes 130 and 140). Stated differently, the ADC 150 may determine a digital bandgap based on the received analog signals from the front-end component 100 without receiving a reference bandgap signal from an external component and/or a component external to the ADC 150. That is, unlike disadvantageous analog-to-digital converters, the ADC 150 performs the conversion without receiving an external signal, such as a bandgap signal. The ADC 150 may be a low pass ADC or a band pass ADC, for example. The ADC 150 may provide an output (in the digital domain) to the digital backend 160 (that includes a mixer and demodulator).

The ADC 150 may be designed to measure a ratio B=(V1−V2)/(V1+V2). The actual difference in the diode voltages may then be computed as $V_{ADC}=B/(1+a*B)$, where a is constant. This formulation may allow a computation of the ADC output with an internal reference. The final digital output may be proportional to just V1−V2, given by (V1−V2)/K, where K is a constant that relates to a bandgap voltage of silicon and does not depend on temperature.

The digital backend 160 may calculate a temperature based on the output from the ADC 150. The calculated temperature, shown in FIG. 1 as Temperature, may be output from the digital backend 150 and may be provided to a device to store and analyze the data. The calculated temperature may be based on the voltages V1 and V2 across the diodes 130 and 140 when the currents $I_1$ and $I_2$ are flowing.

The following equations show the determination of the temperature:

$$V1 = mkT/q * \ln(I_1/Is)$$

$$V2 = mkT/q * \ln(I_2/Is)$$

$$B = (V1-V2)/(V1+V2)$$

$$V_{ADC} = B/(1+aB) = (V1-V2)/\text{constant}$$

$$V_{ADC} \alpha mkT/q \ln(I_1/I_2),$$

, where m is an ideality factor of a diode, k is Boltzmanns constant, T represents temperature and q represents an electron charge. After digital computation of the ratio from the ADC data, the output may be directly proportion to the temperature.

Figure 2:
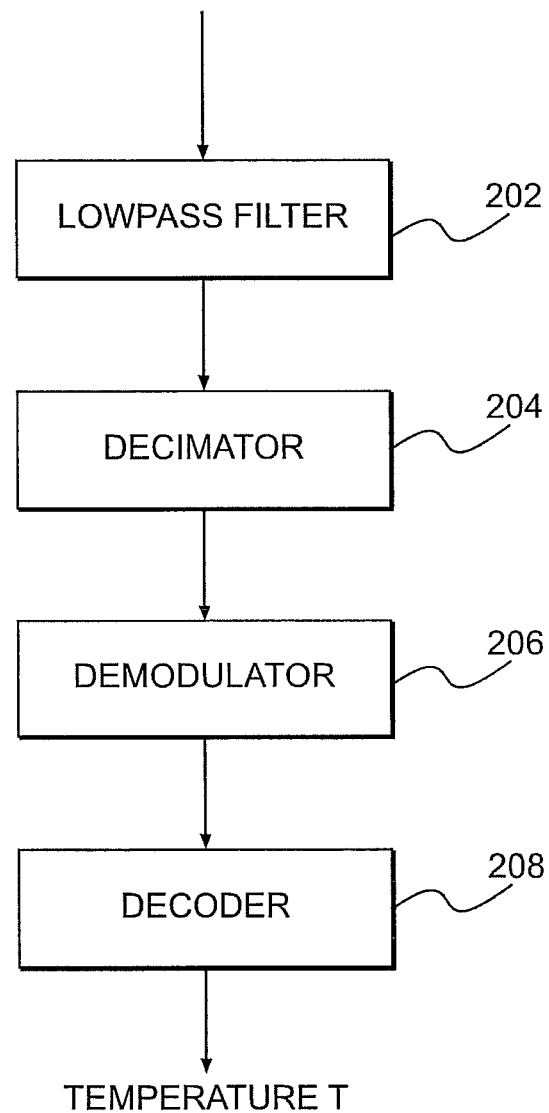
FIG. 2 is a flow chart showing operations within a digital backend according to an example embodiment of the present invention.

FIG. 2 is a flow chart showing operations within a digital backend according to an example embodiment of the present invention. Other embodiments, operations and orders of operation are also within the scope of the present invention. More specifically, FIG. 2 represents operations that may be performed on the digital output signals of the analog-to-digital converter 150. The operations shown in FIG. 2 may be performed by the digital backend 160 shown in FIG. 1.

FIG. 2 shows that the digital output signals of the analog-to-digital converter 150 may be provided to a low-pass filter at operation 202. The low-pass filter may filter out high frequency noise and allow the lower frequency signals to pass. In operation 204, the low frequency signals may pass through a decimator. The decimator may reduce a sampling rate to match the sampling rate to a chopping rate.

In operation 206, the signals output from the decimator may be provided to a demodulator. The demodulator may perform a demodulation on the received differential signals in a digital domain. In operation 208, the signal output from the demodulator may be provided to the decoder that performs a temperature calculation in order to output a calculated temperature. For example, the decoder may output the calculated temperature based on a specific formula or a look up table. This digital correction may eliminate or reduce systematic offsets and nonlinearities.

Figure 3:
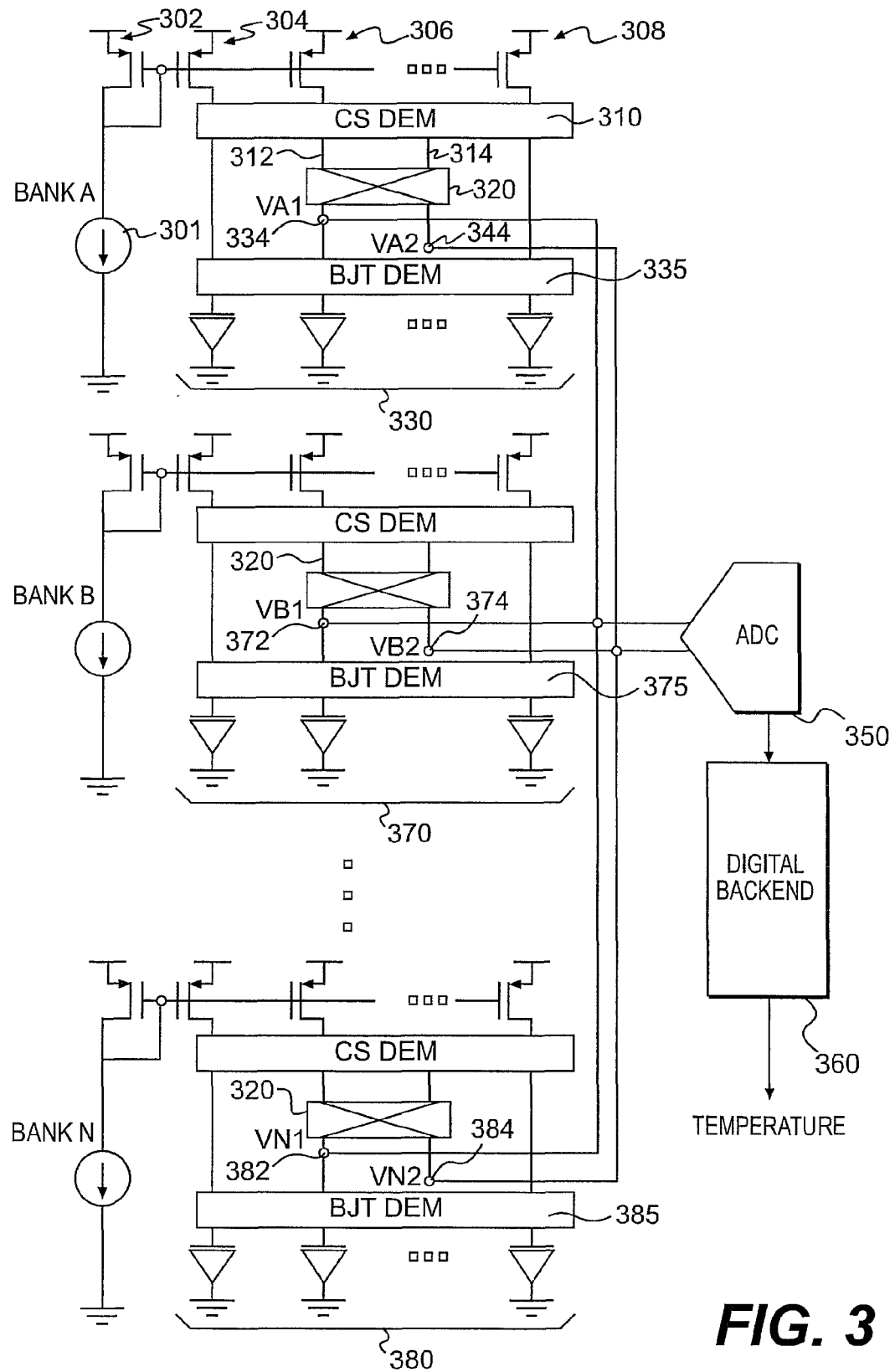
FIG. 3 is a diagram of a thermal sensor device according to an example embodiment of the present invention.

FIG. 3 is a diagram of a thermal sensor device according to an example embodiment of the present invention. Other embodiments and configurations are also within the scope of the present invention. More specifically, FIG. 3 shows a plurality of banks (Bank A, Bank B, . . . , Bank N) of front end components of the thermal sensor device. While FIG. 3 only shows Bank A, Bank B and Bank N, other numbers of banks may also be provided. Each of the banks represents a separate set of sensing diodes to sense a temperature of the die. Each of the respective banks may be coupled to an analog-to-digital converter 350. The analog-to-digital converter 350 may also be coupled to a digital backend 360, which in turn provides the calculated temperature. The time phase at which each bank measures may be changed to improve a total signal to noise ratio of the measurements.

The analog-to-digital converter 350 may receive analog voltage signals separately from the respective banks. The analog-to-digital converter 350 may perform an analog to digital conversion of received voltage signals in a similar manner as the analog-to-digital converter 150 discussed above with respect to FIG. 1. The ADC 350 may receive analog voltage signals and convert the analog voltage signals to corresponding digital signals. The ADC 350 may operate without receiving an outside reference signal or bandgap signal. That is, the ADC 350 may calculate a digital bandgap in the digital domain based on the received voltages. The ADC 350 may provide an output (in the digital domain) to the digital backend 360 (that includes a mixer and demodulator).

The digital backend 360 may calculate a temperature based on the outputs from the ADC 350. The calculated temperature may be based on the received voltages across sensing diodes (of a specific bank) when current is flowing through the sensing diodes. The calculated temperature, shown as Temperature, may be output from the digital backend 360.

Each bank shown in FIG. 3 may be separately operable to provide different analog voltage signals to the ADC 350. For example, each bank may separately control current through the respective diodes of the bank in order to provide analog voltage signals. Each bank may include a plurality of sensing diodes each to sense the temperature of the die. Each bank may individually control the specific diodes that sense the temperature of the die. Control of the diodes used to sense the die may be performed by a diode (or transistor) dynamic element matching (DEM) device that is provided with respect to each bank. Accordingly, the use of both a current source DEM device, a diode (or transistor) DEM device and a chopper allows different ratios of analog voltages to be determined and provided to the ADC 350. This therefore allows different voltages based on different ratios of current sources and based on specific sensing devices (i.e., diodes). Each of the banks shown in FIG. 3 may be provided in a different area of the die. The use of different banks each having separate ability to control current sources and diodes may allow more individual calculations of temperature and more data in order to accurately determine the temperature of the die.

Bank A will now be described. Bank A includes a reference current source 301 and an array of current sources 302, 304, 306 and 308. Bank A further includes a current source (CS) dynamic element matching (DEM) device 310 and a chopper 320. The current sources 302, 304, 306 and 308, the DEM device 310 and the chopper 320 operate in a similar manner as discussed above with respect to the current sources 102, 104, 106 and 108, the DEM device 110 and the chopper 120. For ease of illustration, these operations will not be fully discussed again.

Bank A further includes a diode (or transistor) DEM device 335 provided between the chopper 320 and a plurality of sensing diodes 330. The plurality of diodes 330 may include diodes $330_1$, $330_2$, and $330_m$. Other numbers of diodes may also be provided. The DEM device 335 may include a plurality of switches that operate to provide current to different ones of the diodes 330. For example, the DEM device 335 may allow currents to flow to the diode $330_1$ and to the diode $330_2$. The voltage VA1 at the node 334 may then correspond to the current flowing through the diode $330_1$. Additionally, the voltage VA2 at the node 344 may then correspond to the current flowing through the diode $330_2$. The VA1 and VA2 may be based on the ratio of currents flowing through the selected diodes. As another example, the DEM device 335 may allow current to flow to the diode $330_2$ and to the diode $330_m$. The voltages VA1 and VA2 at the nodes 334 and 344 may accordingly be different. The ability to select different ones of the diodes 330 allows for more measurements of the temperature and therefore better and fuller measurements since each diode may have a slightly different fabrication and thus different voltage/current characteristics.

The chopper 320 receives outputs of the DEM device 310 on signal lines 312 and 314. The outputs on the signal lines 312 and 314 may be currents selected by the DEM device 310. The chopper 320 may operate in a similar manner as discussed above with respect to the chopper 120. The chopper 320 provides voltage outputs VA1 and VA2 at nodes 334 and 344, respectively. The voltages VA1 and VA2 represent the voltages across the two diodes that are selected by the DEM device 335. The voltages VA1 and VA2 are based on the ratio of currents flowing through the selected diodes.

The node 334 may be coupled to one of the diodes 330 through the DEM device 335. The node 344 may be coupled to one of the diodes 330 through the DEM device 335. Similar to the discussion above, the diodes 330 may each be a component of a separate bipolar junction transistor in which an emitter of the respective transistor is coupled to the DEM device 335 and a collector and a base of each respective transistor is coupled to GROUND.

Each of the other banks, such as Bank B and Bank N, may include an arrangement of components similar to the arrangement of components in Bank A. Bank B may include nodes 372 and 374 between the chopper 320 (of Bank B) and a DEM device 375. The DEM device 375 may include a plurality of switches that operate to provide current to different ones of the diodes 370 within the Bank B. The voltages VB1 and VB2 represent the voltages across the two diodes that are selected by the DEM device 375 of the Bank B. The voltages VB1 and VB2 are based on the ratio of currents flowing through the selected diodes.

Bank N may include nodes 382 and 384 between a chopper 320 (of the Bank N) and a DEM device 385. The DEM device 385 may include a plurality of switches that operate to provide current to different ones of the diodes 380 within the Bank N. The voltages VN1 and VN2 represent the voltages across the two diodes that are selected by the DEM device 385 of the Bank N. The voltages VN1 and VN2 are based on the ratio of currents flowing through the selected diodes.

Figure 4:
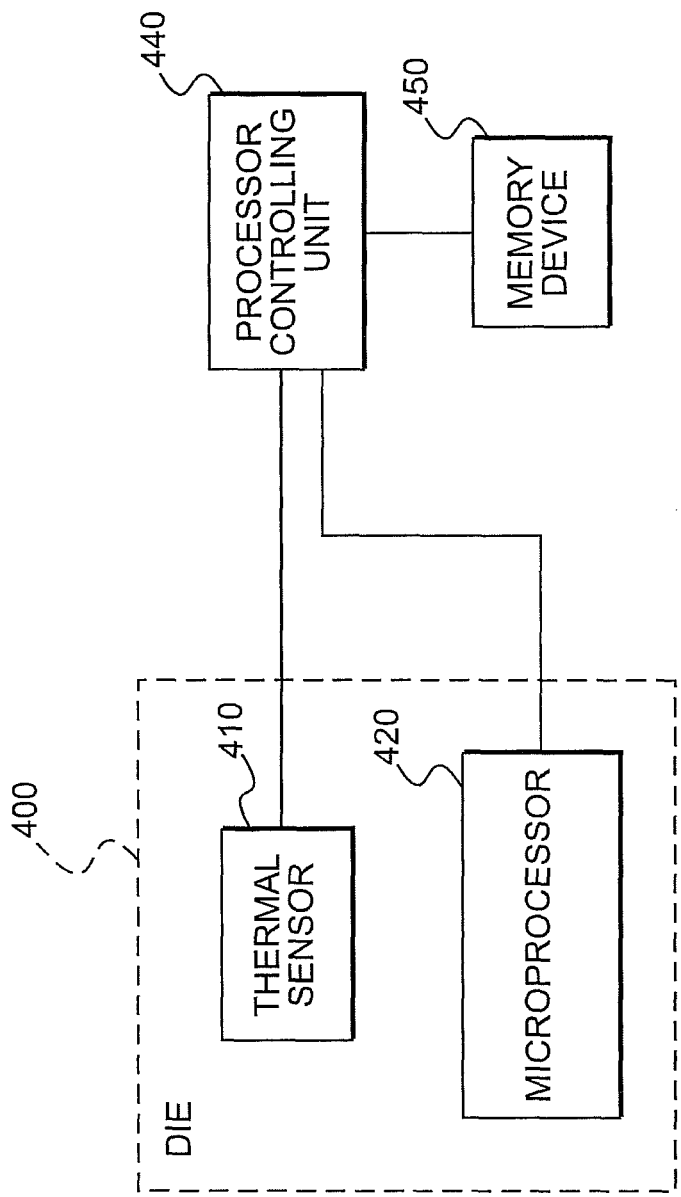
FIG. 4 is a block diagram of a system using a thermal sensor device according to an example embodiment of the present invention.

FIG. 4 is a block diagram of a system using a thermal sensor device according to an example embodiment of the present invention. Other embodiments and configurations are also within the scope of the present invention. More specifically, FIG. 4 shows a die 400 that may include a thermal sensor device 410 and a microprocessor 420. The die 400 may also include other components that are not shown in FIG. 4. The thermal sensor device 410 may correspond to any one of (or components of) the thermal sensor devices discussed above.

The thermal sensor device 410 may provide a signal (or signals) indicative of the calculated temperature to a processor controlling unit 440, which may or may not be provided off-die. The processor controlling unit 440 may receive a signal indicating the calculated temperature from the digital backend 160 (or 360) and store information of the received signal (i.e., a temperature value) in a memory device 450. The memory device 450 may be any of a plurality of different types of memory such as a cache, a random-access memory (RAM), a read-only memory (ROM), a programmable read-only memory (PROM), an erasable programmable read-only memory (EPROM) and an electrically erasable programmable read-only memory (EEPROM).

The memory device 450 may store the temperature value as well as additional data related to obtaining the calculated temperature, such as current sources, ratios of current sources, current and/or diodes that were used in the calculation of the temperature. The memory device 450 may therefore store information of a plurality of temperature values with each stored value representing a different combination of current, current sources, ratios and/or diodes.

The processor controlling unit 440 may analyze the stored data within the memory device 450 in order to determine a temperature value of the die 400. The determined temperature may be based on the plurality of calculated temperature values stored in the memory device 450. The processor controlling unit 440 may determine the temperature value based equations described above using a mathematical computation or based on a look up table that relates the measure digital value to a temperature.

Based on the determined temperature, the processor controlling unit 440 may communicate with components, such as the microprocessor 420, on the die 400. The communication may be the determined temperature or may be instructions on how to operate based on the determined temperature. For example, the processor controlling unit 440 may communicate information regarding throttling in order to decrease the temperature on the die 400.

The memory device 450 may store information of a plurality of signals received from the digital backend 160 (or 360). The information of each received signal may represent a separate calculated temperature. The processor controlling unit 440 may determine a temperature of the die based on the information stored at the memory device 450 from the received signals. Each of the plurality of signals received from the digital backend being based on a different ratio of currents flowing through the diodes.

Embodiments of the present invention may provide a thermal sensor device that includes two diodes that are driven by current sources and an output that is measured by an ADC.

The outputted temperature value may be independent of all current proportional terms including parasitic transistor or diode resistance and interconnect resistance. The temperature measurement may be more robust and accurate and may be more independent of current and resistive components. There may also be a substantive reduction in test time due to the measurement scheme of example embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus comprises:
    a plurality of current sources;
    a first diode;
    a second diode;
    a chopper to direct current from at least two of the plurality of current sources to the first and second diodes, respectively;
    an analog to digital converter (ADC) having an input which is directly coupled to the chopper; and
    a first circuit coupled to the chopper and a plurality of diodes including the first and second diodes,
    wherein the first circuit is operable to select the first and second diodes from a plurality of diodes, and to couple the selected first and second diodes to the chopper.

2. The apparatus of claim 1, wherein the ADC operates independent of a bandgap reference.

3. The apparatus of claim 1, wherein the ADC comprises at least one of:
    a low pass ADC, or
    a band pass ADC.

4. The apparatus of claim 1, wherein the first and second diodes are at least one of:
    a bipolar junction transistor with an emitter terminal coupled to an output of the chopper, a collector terminal coupled to ground, and a base terminal coupled to ground; or
    a MOS transistor.

5. The apparatus of claim 1, wherein the chopper is operable to reverse current signals from the at least two current sources to the first and second diodes.

6. The apparatus of claim 1, wherein the chopper is a current chopper.

7. The apparatus of claim 1, further comprising a second circuit to provide current from the plurality of current sources to the chopper, the current provided by the circuit being ratioed currents.

8. The apparatus of claim 7, wherein the second circuit comprises a plurality of switches, at least one of which operates to provide different amounts or different ratios of currents to the chopper.

9. The apparatus of claim 8, wherein at least one of switches of the plurality of switches is controlled by a controller or a processor.

10. The apparatus of claim 1, further comprising a third circuit, coupled to the ADC, to demodulate an output of the ADC and to provide a calculated temperature.

11. The apparatus of claim 10, wherein the third circuit comprises:
    a low pass filter (LPF);
    a decimator; and
    a demodulator.

12. The apparatus of claim 10, further comprising a lookup table to store the calculated temperature.

13. A system comprising:
    a memory; and
    a processor coupled to the memory, the processor including
        a thermal sensor which comprises:
        a plurality of current sources;
        a first diode;
        a second diode;
        a chopper to direct current from at least two of the plurality of current sources to the first and second diodes, respectively;
        an analog to digital converter (ADC) having an input which is directly coupled to the chopper; and
        a first circuit coupled to the chopper and a plurality of diodes including the first and second diodes, wherein the first circuit is operable to select the first and second diodes from a plurality of diodes, and to couple the selected first and second diodes to the chopper.

14. The system of claim 13, wherein the processor further comprises a second circuit, coupled to the ADC, to demodulate an output of the ADC and to provide a calculated temperature.

15. The system of claim 13, wherein the memory stores a lookup table to store the calculated temperature.

16. The system of claim 13, wherein the processor further comprises a third circuit to provide current from the plurality of current sources to the chopper, the current provided by the circuit being ratioed currents.

17. The system of claim 13, wherein the chopper is operable to reverse current signals from the at least two current sources to the first and second diodes.

18. An apparatus comprising:
    a plurality of thermal sensing banks, at least one thermal sensing bank including:
        a plurality of current sources,
        a first diode,
        a second diode, and
        a chopper to direct current from at least two of the plurality of current sources to the first and second diodes, respectively, wherein the least one thermal sensing bank comprises a first circuit coupled to the chopper and a plurality of diodes including the first and second diodes; and
    an analog to digital converter (ADC) having an input which is directly coupled to the chopper of the plurality of thermal sensing banks,
    wherein the first circuit is operable to select the first and second diodes from a plurality of diodes, and to couple the selected first and second diodes to the chopper.

19. The apparatus of claim 18, wherein the at least one thermal sensing bank comprises:
    a second circuit to provide current from the plurality of current sources to the chopper, the current provided by the circuit being ratioed currents.

20. The apparatus of claim 18, further comprising a third circuit, coupled to the ADC, to demodulate an output of the ADC and to provide a calculated temperature.

21. The apparatus of claim 18, wherein the chopper is operable to reverse current signals from the at least two current sources to the first and second diodes.

22. The apparatus of claim 18, wherein the ADC measures a ratio of voltages associated with the first and second diodes.

* * * * *